United States Patent [19]

Bayman et al.

[11] 4,218,099

[45] Aug. 19, 1980

[54] WHEEL COVER HAVING SNAP-ON RETENTION MEANS

[75] Inventors: Jack A. Bayman, Valdosta, Ga.; Robert G. Green, Monroe, Mich.

[73] Assignee: International Telephone and Telegraph Corporation, New York, N.Y.

[21] Appl. No.: 958,982

[22] Filed: Nov. 9, 1978

[51] Int. Cl.² .............................................. B60B 7/00
[52] U.S. Cl. .............................. 301/37 R; 24/73 HC; 24/73 B
[58] Field of Search ............... 301/37 R, 37 P, 37 PT, 301/37 PB, 37 B, 108 R, 108 A; 24/73 HC, 73 B

[56] References Cited

U.S. PATENT DOCUMENTS

| 2,761,188 | 9/1956 | Bedford | 24/73 HC |
| 3,973,801 | 8/1976 | Beisch et al. | 301/37 R |

FOREIGN PATENT DOCUMENTS 530686  9/1956  Canada ................................. 301/37 R

*Primary Examiner*—H. Grant Skaggs
*Attorney, Agent, or Firm*—James B. Raden; William J. Michals

[57] ABSTRACT

A wheel cover, for a vehicle wheel having an annular and generally axially extending wheel flange, including a retention ring having a generally axially extending retaining flange and a plurality of circumferentially spaced retention clips in snap-on engagement therewith. Each clip includes an axially and circumferentially extending base portion engaging said retaining flange and having three axially outwardly directed tabs at the axially outer end thereof. The two end tabs are respectively received within, and extend axially outwardly through, a pair of slots disposed in a stepped portion of the retaining flange, and the middle tab projects radially and axially outwardly from the base of the clip for engaging the axially inward side of the stepped portion under tension. Each end tab includes a secondary tab which is struck or lanced out of the central portion of the end tab and which extends axially inwardly and radially outwardly for engaging the axially outward side of the stepped portion. The axially inner end of the base is provided with a reverse-bent hairpin snap-over portion which encircles the free end of the retaining flange. A circumferentially extending retention tooth is lanced out of the base portion and terminates in radially outwardly extending biting edge portions engageable with the wheel flange. A pair of axially extending anti-rotation teeth are lanced out of the base portion at opposite ends of the retention tooth, and the remaining central portion of the base provides a tab adjacent to and connected with the center tension tab for reacting therewith to tension the base against the retaining flange.

10 Claims, 3 Drawing Figures

WHEEL COVER HAVING SNAP-ON RETENTION MEANS

BACKGROUND OF THE INVENTION

This invention relates to wheel cover members motor vehicles and, more particularly, to improved retention devices for maintaining wheel cover members in proper position on a wheel rim, the retention devices being permanently secured to the wheel cover retaining flange in snap-on engagement therewith.

Wheel cover members, including wheel trim members, are relatively light weight devices having relatively flexible outer margins including means for resiliently engaging the wheel rim to maintain the wheel cover in position on the wheel. The retention means are comprised of sheet metal projections formed integrally with the outer marginal flange, or are comprised of independent elements which are individually fastened to the flexible periphery of the retention ring such as by rivetting. It has been found that the individual, independent elements are essential for very heavy ornamented wheel covers. That is, the material of the retaining flange itself is insufficient to retain the wheel cover on the wheel rim due to the vertical shock loads on the wheel cover which often cause excessive deflection of the retention ring and therefore release of the wheel cover. While these individual retention elements have worked quite well, they are difficult and somewhat expensive to manufacture, particularly in view of the requirement for additional fastening means to secure the retention element to the wheel cover.

These and other disadvantages are overcome by the present invention wherein there is provided a snap-on retention clip which in one form of the invention is provided of a one-piece construction. The retention means clip cooperates with slots which are provided in the retention ring to secure the retention means clip onto the wheel cover without necessitating additional fastening devices.

SUMMARY OF THE INVENTION

Briefly, a wheel cover for a vehicle wheel having an annular generally radially facing and axially extending wheel flange is provided. The wheel cover includes a retention ring having a generally axially extending retaining flange with an intermediate stepped portion extending generally outwardly, and a plurality of circumferentially spaced retention clips are provided in snap-on engagement with the retention ring. Each clip includes an axially and circumferentially extending base portion engaging the radially outward side of the retaining flange and having at least one tab at the axially outward end of the base which projects through a slot in the stepped portion of the retaining ring and axially outwardly from the radially inward side of the retaining ring. A reverse-bent portion is provided at the axially inner end of the base portion which encircles the free end of the retention ring and in engagement therewith. At least one generally radially outwardly extending retention tooth is provided on the base portion which terminates in a biting edge portion for engaging the wheel flange.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

Figure 1:
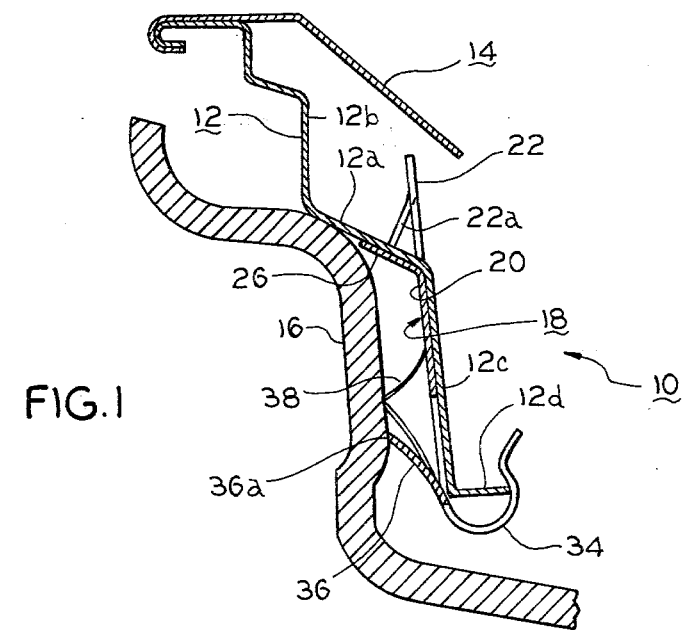
FIG. 1 is a partial cross-sectional view of a wheel cover in conjunction with a wheel rim and illustrating a cross-sectional view of the retention means clip in accordance with the present invention.

Referring now to FIG. 1, there is shown generally at 10 a wheel cover including a retention ring 12 and an ornamental cover member 14 which is clinched, fastened or otherwise attached to the axially outer end of retention ring 12. Wheel cover 10 is retained on wheel rim 16 by means of snap-on retention clip 18 in accordance with the teachings of the present invention. Retention ring 12 includes a stepped portion 12a which separates generally axially extending portions of the retention ring 12b and 12c and which extends generally radially outwardly.

For purposes of clarity and definiteness in describing the details and construction of the retention means clip, in accordance with the present invention, the terms "radially outward" and "radially inward" will be employed to indicate left and right directions, respectively, as viewed in FIG. 1, and the terms "axially outward" and "axially inward" will refer to up and down directions in the same figure. The axis used as a reference line being that of wheel 16 which is also coincident with the axis of the wheel cover 10. The same terms, or the equivalence thereof, will be employed in the claims and the latter are to be interpreted in view of the above definitions.

Figure 2:
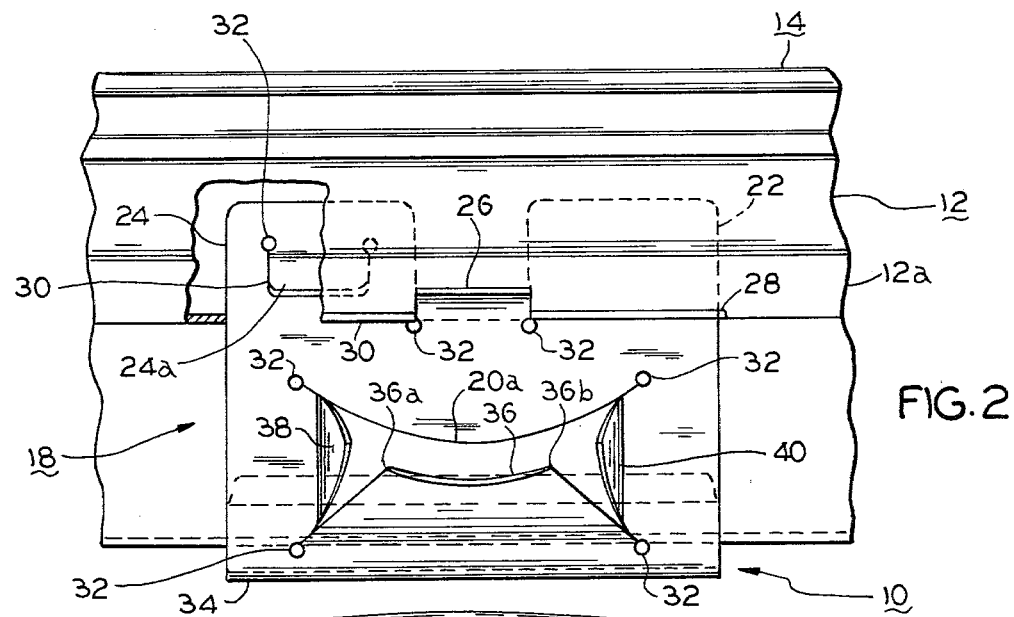
FIG. 2 is a partial plan view of the retention means clip of FIG. 4 shown in conjunction with a partial fragmentary view of the retaining ring of the wheel cover; and, FIG. 3 is an end view of the retention means clip in accordance with the principles of the present invention.
Figure 3:
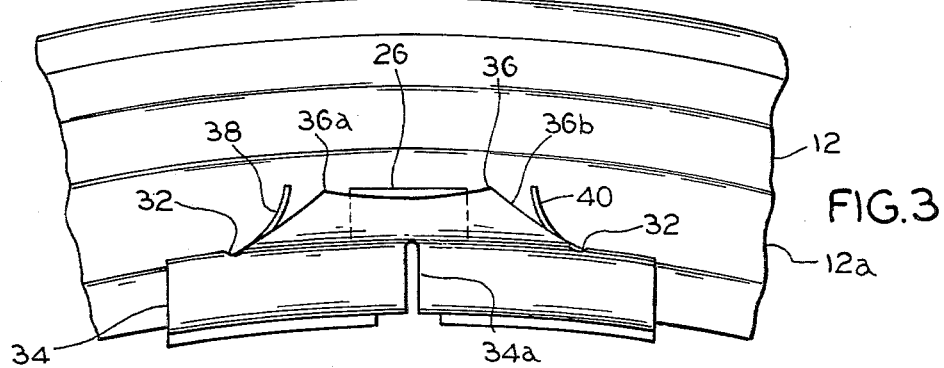

Still referring to FIG. 1, it can be seen that retention means clip 18, which is preferably formed from a flat strip or sheet of hard material such as carbon or spring steel, includes a base portion 20. In a preferred embodiment of the present invention, clip 18 includes a pair of tabs 22 and 24 which extend axially outwardly at the axially outer end of base portion 20, as best illustrated in FIG. 2. Base portion 20 further includes a central or middle tab 26 which is formed so that it extends generally radially and axially outwardly for engagement with the axially inner side of stepped portion 12a. It can be seen that the two end tabs are respectively received within and extend axially outwardly through a pair of pierced slots 28 and 30 which are provided near the radially inner end of stepped portion 12a. Each end tab includes a secondary tab designated 22a and 24a in FIGS. 1 and 2. The secondary tabs are struck from the respective end tabs along a U-shaped line 30 at the ends of which apertures 32 are formed to relieve the stress and reduce the likelihood of tearing of the metallic material of retention means clip 18. Secondary tabs 22a and 24a are resilient and extend generally radially outwardly and axially inwardly for engagement with the axially outer side of stepped portion 12a after tabs 22 and 24 are inserted in the previously provided slots of retaining flange 12.

The axially inner end of base portion 20 is provided with a reverse-bent hairpin snap-on portion 34 which encircles the free end 12d of retaining flange 12. A circumferentially extending retention tooth 36 is struck or lanced out of the base portion 20 and terminates in radially outwardly extending biting edge portions 36a and 36b which are engageable with the wheel flange 16. The end portions of retention tooth 36 are similarly provided with apertures 32 to relieve the stress and reduce the likelihood of tearing of the metal. A pair of axially extending anti-rotation teeth 38 and 40 are also struck or lanced out of the base portion at opposite ends of retention tooth 36. The remaining central portion of the base provides a tab 20a which is adjacent to and connected with center tab 26 for reacting therewith to tension base 20 against retaining flange 12.

The central edge portion of hairpin portion 34 is provided with a radially extending slot 34a which facilitates forming clip 18 in an arcuate manner so as to more closely conform to the circular shape of retaining flange 12. It should now be appreciated that clip 18 is readily installed onto retaining flange 12 of wheel cover 10 simply by inserting the projecting end tabs into the corresponding pair of slots 28 provided in stepped portion 12a of retaining flange 12.

What has been taught, then, is a wheel cover having a novel snap-on retention means facilitating, notably, the retention of heavy ornamental wheel covers and which can be secured to the wheel cover without necessitating additional fastening members such as rivets or welding. The form of the invention illustrated and described herein is but a preferred embodiment of these teachings. It is shown as an illustration of the inventive concept, however, rather than by way of limitation, and it is pointed out that various modifications, and alterations may be indulged in within the scope of the appended claims.

What is claimed is:

1. A wheel cover for a vehicle wheel having an annular generally radially facing and axially extending wheel flange, said wheel cover comprising, in combination:
   a retention ring having a generally axially extending retaining flange with an intermediate stepped portion extending generally radially outwardly;
   a plurality of circumferentially spaced retention clips in snap-on engagement with said retention ring, each clip including:
   an axially and circumferentially extending base portion engaging the radially outward side of said retaining flange and having at least one tab at the axially outward end of said base which projects through a slot in said stepped portion of said retaining ring and axially outwardly from the radially inward side of said retaining ring;
   a reverse-bent portion at the axially inner end of said base portion which encircles the free end of said retention ring;
   at least one generally radially outwardly extending retention tooth on said base portion and terminating in biting edge portions for engaging said wheel flange; and,
   wherein said clip includes an additional tab at said axially outward end of said base which projects radially and axially outwardly from said base for engaging the axially inward side of said stepped portion.

2. The wheel cover according to claim 1, wherein said clip includes a pair of tabs respectively projecting through a pair of slots in said stepped portion and on opposite sides of said additional tab.

3. The wheel cover according to claim 2, wherein said retention tooth is lanced out of and deflected away from said base portion of said clip, and extends circumferentially of said clip.

4. The wheel cover according to claim 3, wherein said clip includes at least one anti-rotation tooth lanced out of said base portion at one end of said retention tooth and extending generally axially for engaging said wheel flange.

5. The wheel cover according to claim 4, wherein said clip includes a pair of said anti-rotation teeth at opposite ends of said retention tooth.

6. The wheel cover according to claim 5, wherein said clip includes a central tab on said base portion which is adjacent said additional tab and coacts therewith to tension said base portion against said retaining flange.

7. The wheel cover according to claim 5, wherein the central portion of said reverse bent end portion is split so that said base portion more readily conforms to the circular shape of said retaining flange along the circumference thereof.

8. The wheel cover according to claim 2, wherein each tab of said pair of tabs includes a resilient secondary tab formed from and deflected radially outwardly of the tab with the free end thereof engaging the axially outward side of said stepped portion thereby locking said clip to said retaining flange after said pair of tabs are inserted into said slots.

9. The wheel cover according to claim 8, wherein said stepped portion of said retaining flange extends generally radially outwardly and separates two generally axially extending portions of said retaining flange.

10. A wheel cover for a vehicle wheel having an annular generally radially facing and axially extending wheel flange, said wheel cover comprising, in combination:
   a retention ring having a generally axially extending retaining flange with an intermediate stepped portion extending generally radially outwardly;
   a plurality of circumferentially spaced retention clips in snap-on engagement with said retention ring, each clip including:
   an axially and circumferentially extending base oortion engaging the radially outward side of said retaining flange and having at least one tab at the axially outward end of said base which projects through a slot in said stepped portion of said retaining ring and axially outwardly from the radially inward side of said retaining ring;
   a reverse-bent portion at the axially inner end of said base portion which encircles the free end of said retention ring; and,
   at least one generally radially outwardly extending retention tooth on said base portion and terminating in biting edge portions for engaging said wheel flange; and,
   wherein said clip includes a pair of tabs respectively projecting through a pair of slots in said stepped portion and wherein each tab of said pair of tabs includes a resilient secondary tab formed from and deflected radially outwardly of the tab with the free end thereof engaging the axially outward side of said stepped portion thereby locking said clip to said retaining flange after said pair of tabs are inserted into said slots.

* * * * *